United States Patent
Pitts et al.

(10) Patent No.: US 6,522,431 B1
(45) Date of Patent: Feb. 18, 2003

(54) SYSTEM FOR MINIMIZING IMAGE DEFECTS IN A HARD-COPY INPUT SCANNER

(75) Inventors: Ian Pitts, Bassingbourn (GB); Duncan I. Stevenson, St. Albans (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/298,888

(22) Filed: Apr. 26, 1999

(51) Int. Cl.[7] ............................................... H04N 1/04
(52) U.S. Cl. ..................... 358/474; 358/496; 358/488; 358/486; 358/498
(58) Field of Search ................................. 358/496, 474, 358/498, 488, 406, 486; 399/16, 17, 9, 11

(56) References Cited

U.S. PATENT DOCUMENTS

| | | | |
|---|---|---|---|
| 4,558,373 A | * 12/1985 | Plasencia et al. | 358/498 |
| 5,214,470 A | 5/1993 | Denber | 355/75 |
| 5,339,139 A | 8/1994 | Fullerton et al. | 355/215 |
| 5,467,410 A | 11/1995 | Bloomberg | 382/100 |
| 5,644,409 A | 7/1997 | Irie et al. | 358/461 |
| 5,982,512 A | * 11/1999 | Kim | 358/498 |

* cited by examiner

Primary Examiner—Cheukfan Lee
(74) Attorney, Agent, or Firm—R. Hutter

(57) ABSTRACT

In a document handler associated with a scanner, such as for a digital copier or facsimile machine, an image-bearing sheet is moved over a window, through which the image is recorded by a photosensitive chip. When a spot of dirt attaches to the window, a streak results in the image data. This streaking problem is minimized by having the scan line viewed by the photosensitive chip move a small distance within the window of the document handler, so that any spot on the window will not be repeatedly exposed by the photosensitive chip.

22 Claims, 1 Drawing Sheet

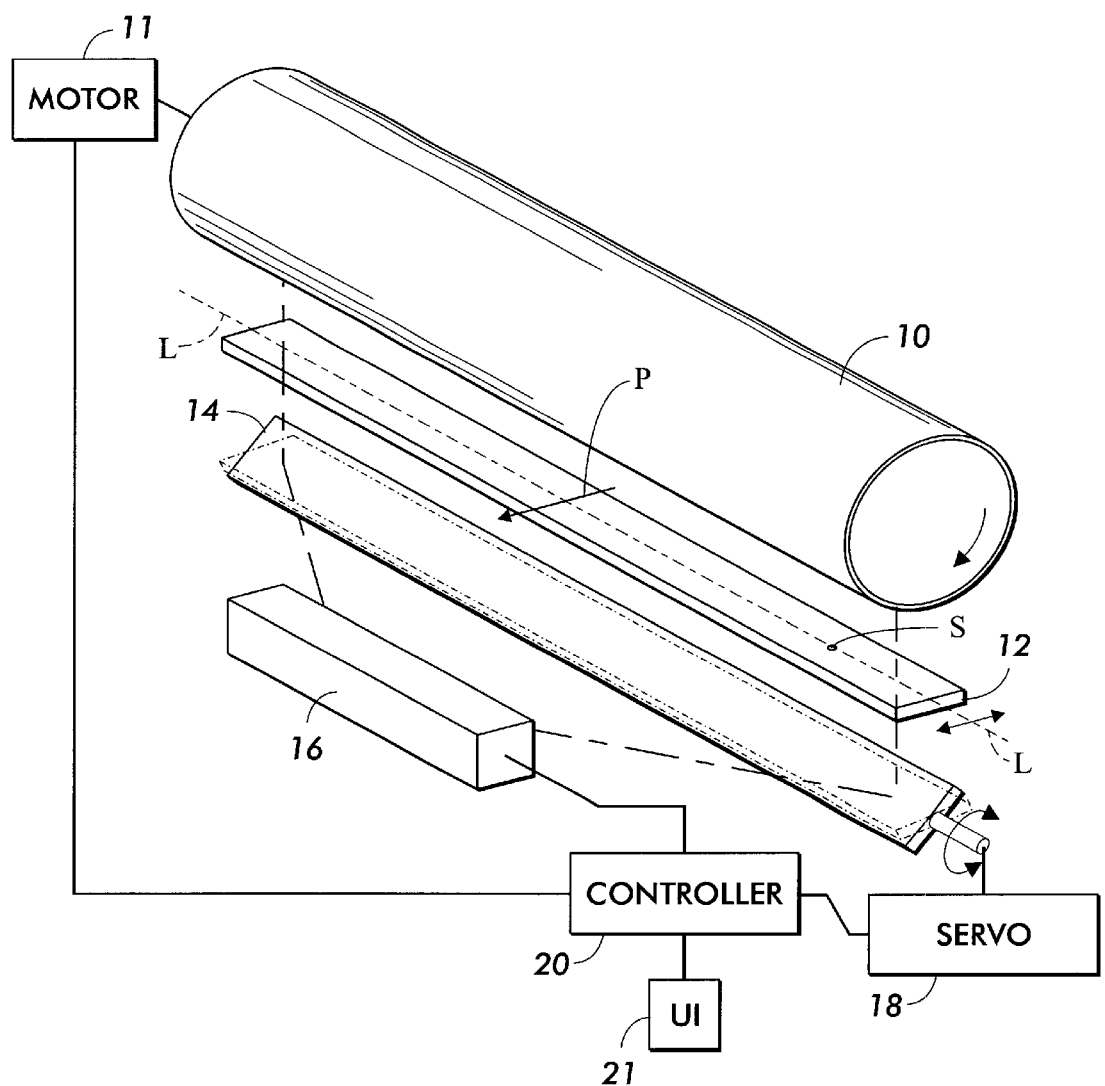

SYSTEM FOR MINIMIZING IMAGE DEFECTS IN A HARD-COPY INPUT SCANNER

FIELD OF THE INVENTION

The present invention relates to input scanners as would be found, for example, in digital copiers, facsimile machines, and the like.

BACKGROUND OF THE INVENTION

Certain types of familiar office equipment, such as copiers, or facsimile machines, accept images from hard-copy sources for recording and reproduction. Very often these original images originate on sheets of paper which are fed through an automatic "document handler" which takes a stack of sheets and feeds them serially over a platen or other window, where the images are recorded. In a digital copier, facsimile machine, or scanner, the window is associated with one or more photosensitive semiconductor chips which convert the light reflected from the series of small areas on each sheet into video signals which are then digitized and converted to digital image data, which can then be retained in a memory. In the case of the standard "light lens" or "analog" copier, the light reflected from the series of sheets fed through the scanner is directed to a photoreceptor, as is well known in the art.

In one particular type of document handler, a type which is particularly useful for digital applications such as a digital copier or facsimile, the platen or window over which sheets are successively passed is essentially a narrow slit, through which only a relatively thin line of each sheet is "viewed" at a time, such as by the photosensitive semiconductor chip. In such a design, each sheet being fed through the document handler is passed at a known velocity over the window or platen while the photosensitive semiconductor chip records and outputs data over time. In other words, in such an arrangement, the photosensitive chip is exposed a series of very thin views of the sheet over time, and then circuitry associated with the chip in effect reassembles a large number of such slits to accumulate data descriptive of the entire image on the sheet. One example of a design of a document handler of this configuration is given in U.S. Pat. No. 5,339,139. Such a document handler which moves sheets at a constant velocity over a narrow platen or window is known as a "constant velocity transport" or CVT.

One practical problem which has been noticed in applications of a CVT, particularly in regard to digital copiers and facsimile machines, is the fact that a small quantity of dirt which may attach to the small window or platen over which each sheet passes can cause a significant image defect in resulting digital images. Because a spot of dirt is stationary on the window, the image of the dirt on the window is repeatedly scanned by the photosensitive chip even as successive areas of one sheet move over the window. When a printout is made of the image thus recorded with the CVT, the print will have a straight streak on it corresponding to the position of the original spot of dirt.

The present invention is directed toward a technique for minimizing or eliminating the effect of small quantities of dirt on the window of a CVT in a hard copy scanner.

DESCRIPTION OF THE PRIOR ART

In the prior art, U.S. Pat. No. 5,214,470 discloses a method and apparatus for detecting the presence of dirt or abrasions on a document platen and preventing these defects from being reproduced as unwanted spots on output copies. The platen is first scanned without a document placed thereon and an electronic image is generated and stored which contains information on the location of a dirt spot or inherent defect such as etched marks on the platen. Upon the initiation of a scanning mode with a document placed on the platen, the scanned electronic document image is subjected to a logical XOR process to correlate the previously stored spot location with the same location on the document image. Once the spot location is determined, the spot is erased within the digital image data. Significantly, this patent does not disclose the special problems of dirt appearing on the window of a CVT or other automatic document handler.

U.S. Pat. No. 5,339,139 is cited as an example of a document feeding system, otherwise known as a constant velocity transport or document handler, as would be found, for instance, in a currently-available digital copier.

U.S. Pat. No. 5,467,410 discloses a software technique for quickly determining whether a binary input image originated as a blank page, submission of blank pages being a possible occurrence when accepting data from a device having an automatic document handler. The disclosure recognizes that a page image may contain vertical streaks that are not part of the original paper document. A threshold analysis typically allows a certain number of such streaks to be present without concluding that the page is not blank.

U.S. Pat. No. 5,644,409 discloses a system used in conjunction with a document handler. In particular, the patent discloses a system for compensating for dirt accumulating within the document handler, such dirt affecting the white reference value when the apparatus is calibrated.

SUMMARY OF THE INVENTION

According to the present invention, there is provided a method of operating a document handler for causing an image-bearing sheet to pass over a light-transmissive window in a process direction for recording by a photosensitive member, the photosensitive member being exposed to a portion of the image-bearing sheet through a scan line which is narrower than the window along the process direction. The scan line is caused to move parallel to the process direction relative to the window.

BRIEF DESCRIPTION OF THE DRAWINGS

FIG. 1 is a simplified, partially schematic diagram showing the essential portions of a document handler or constant-velocity transport as used with the present invention.

DETAILED DESCRIPTION OF THE INVENTION

FIG. 1 is a simplified view showing some essential hardware elements of a constant velocity transport (CVT) as used in a document handler as would be found, for example, in a digital copier. Although only the most essential elements of such hardware are shown in the figure, a more detailed implementation of a document handler as used in a digital copier may be seen for example in U.S. Pat. No. 5,339,139, issued to the assignee hereof. With particular reference to the figure, a roller 10 rotating in the indicated direction and moved ultimately by a motor 11 drives a sheet of paper (not shown) thereon in a process direction P over what is here called a "window" 12. In a practical embodiment of the hardware, it is likely that roller 10 will be placed in very close proximity to the top surface of window 12, the roller 10 and surface of window 12, thus forming a relatively narrow nip for the passage of a single sheet of paper therethrough.

The window 12 is light-transmissive, and light from a light source (not shown) reflected from a sheet riding on roller 10 would pass through window 12 and, in this particular embodiment, be reflected onto a mirror 14. The light reflected from mirror 14 would then be directed to a photosensitive semiconductor chip such as shown as 16. Depending on the size of photosensitive chip 16, there may be included any amount of reductive optics (not shown). In an alternate embodiment of the present invention, instead of a relatively short single photosensitive chip 16, there could be provided a "full width array" of photosensors, meaning an arrangement of photosensors which extend the full width of roller 10 so that reductive optics, or even the mirror 14, are not required.

When a sheet riding on the outer surface of roller 10 is caused to move in process direction P over the window 12, the photosensitive chip 16 is exposed, through window 12 and mirror 14 to a series of "slits" representing individual window-wide rows of pixels from the original image riding on roller 10. Photosensitive chip 16 typically defines a single linear array of photosensors, each photosensor in the array "seeing" one pixel in this slit at a time. As is well known, as a succession of slits forming an entire image is viewed by photosensitive chip 16, the data resulting from the series of slits can be reassembled, by downstream circuitry such as indicated as control 20, to synthesize data representative of the entire page image.

A practical problem which has been noted with document handlers of the general design shown in FIG. 1 occurs when a spot of dirt or other debris (or, alternately, an abrasion which has been created on window 12), is attached to either the top or bottom surface of window 12. If a spot such as S on a surface of window 12 remains stationary even as a sheet is passed over window 12 by roller 10, the spot S will be repeatedly recorded.

The present invention overcomes the problem of a spot S on window 12 by exploiting the fact that the photosensitive chip 16 actually exposes through a relatively small section of window 12 at any given time. The "scan line" indicated as L—L shown in FIG. 1 is a line, having a small but finite thickness along process direction P, through which the linear array of photosensors of photosensitive chip 16 actually "see" through window 12. The width of line L—L, which corresponds to the width of a slit which the photosensors on chip 16 view at any given moment on a sheet passing over roller 10 is typically of a thickness on the order of 100 micrometers or less; in contrast, the effective practical width along process direction P of all of window 12 is typically on the order of 5 millimeters. Thus, in many practical embodiments of a document handler with a CVT, there is a relatively large margin between the effective width of window 12 and the section of window 12 which is actually being viewed through by the photosensitive chip 16.

With this discrepancy in scale between the width of line L—L and the width of window 12, it will be apparent that, through small incremental adjustments to the hardware, the specific position of line L—L within window 12 can be altered. In particular, the position of line L—L can be altered so that the line L—L avoids a detected spot such as S which is somewhere on window 12. The present invention enables the hardware of the scanner to be adjusted so that detected spots on window 12 can be avoided.

With particular reference to the arrangement in FIG. 1, it can be seen that mirror 14 is associated with a servo 18, of a design known in the art, which enables the mirror 14 to be pivoted in small increments. It will be apparent that small adjustments to the position of mirror 14 will have the effect of moving the position of line L—L relative to window 12. Thus, according to one embodiment of the present invention, if at some point in the operation of the document handler, a spot S is detected on window 12 by control means 20, servomotor 18 incrementally repositions mirror 14 until scan line L—L no longer intersects the spot S. Once the scan line L—L is thus moved to a relatively clean area of the window 12, document scanning can be resumed. It may also be desirable to have control system 20, upon detection of a spot S on window 12, indicate through a user interface 21 (either on the touch-panel of the machine itself, or remotely to a key operator or system administrator) that the window 12 should be cleaned manually.

According to one embodiment of the present invention, this search for the cleanest possible area within window 12 is performed when no sheet is being fed over roller 10: preferably, the surface of roller 10 should be of a quality (such as being white) that any spot on window 12 would appear conspicuous thereagainst. In such a case, the control system associated with photosensor array 16 would identify any detected dark area along scan line L—L as dirt or debris on window 12, and a relatively clean position of scan line L—L would be one with minimal or undetectable dark areas detected by photosensor array 16.

Numerous variations on the general method of moving scan line L—L will be apparent. For instance, at startup, or at some regularly-scheduled time during operation, the control system 20 can cause servomotor 18 to cycle mirror 14 so that scan line L—L is slowly moved through the width of window 12 along process direction P, so that the "cleanest" position of scan line L—L along window 12 can be detected and selected for use when pages are fed through the document handler. If no portion of window 12 is deemed clean enough for scanning, once again a message to the user or key operator to clean window 12 manually can be displayed through user interface 21.

According to another variation of the present invention, adjustment of scan line L—L can occur while sheets are being fed under-roller 10 in a scanning operation. If detection of a spot S on window 12 is thus desired to occur "on the fly," the control 20 is made sensitive to the behavior of individual photosensors in array 16: a spot S would result in at least one photosensor in array 16 constantly outputting a "black" area even as the image-bearing sheet moved past window 12. Such a "streak" condition detected by control 20 can cause the control 20 to cause servomotor 18 to move scan line L—L to a cleaner portion of window 12; according to one aspect of the present invention, an incremental motion of scan line L—L can be the result of a detected spot S on window 12.

In an alternate embodiment of the invention, servomotor 18 can be operated to move scan line L—L continuously while a page is being passed over window 12. In this way, if there is a spot S on one small portion of window 12, the optical effect thereof will only be apparent in the resulting image data for the relatively brief period when scan line L—L intersects with the spot S; in many cases the relatively small image defect that may result in output image data may be tolerable to a user.

If motion of scan line L—L occurs while pages are being fed over window 12, the speed of motor 11 which is driving roller 10 can be adjusted to compensate for the motion of scan line L—L: for instance, if at one point in the scanning operation, scan line L—L is moving in process direction P, the motor 11 can cause roller 10 to speed up slightly to compensate for the motion of scan line L—L, and if the scan line L—L is being moved against process direction P at a given time, the motor 11 can be caused to slow down roller 10 to compensate. In one possible embodiment, the servo motor 18 causes scan line L—L to move through the width of window 12 backward or forward as each sheet passes over window 12, so that scan line L—L moves back and forth in a cycle with every two sheets passing over window 12. This would have the advantage of allowing a speed change to motor 11 between sheet feeds, and not while a sheet is being passed over window 12.

Although a very specific hardware embodiment is shown in FIG. 1, wherein servomotor 18 varies the angle of a mirror 14, it will be apparent that many variations on the basic hardware can be provided to perform the desired motion of scan line L—L, either when the document handler is empty or when the document handler is actually feeding sheets. A servomotor 18 can cause mirror 14 to pivot, as shown, or else to move back and forth linearly. Also, it is fairly common in scanner designs to have the photosensitive chip 16 (or a full width array of photosensors) mounted on a carriage which moves under a platen. An example of such a moving carriage is the raster input scanner (RIS) indicated as 14 in U.S. Pat. No. 5,339,139: this same carriage can be used to move under a page-size platen in a digital copier. It will be apparent that such a carriage, moved only a short distance, can have the desired effect of moving scan line L—L through the relatively small window 12 associated with the CVT or document handler.

What is claimed is:

1. In a document handler for causing an image-bearing sheet to pass over a light-transmissive window in a process direction for recording by a photosensitive member, the photosensitive member being exposed to a portion of the image-bearing sheet through a scan line which is narrower than the window along the process direction, a method comprising the steps of:
   monitoring an output of the photosensitive member when the scan line is in a first position relative to the window and when the scan line is in a second position relative to the window;
   determining, based on said monitoring step, whether the window is cleaner with the scan line in the first position or the second position; and
   causing the scan line to move parallel to the process direction relative to the window.

2. The method of claim 1, further comprising the step of monitoring an output of the photosensitive member as the scan line is caused to move through a series of positions along the window.

3. The method of claim 1, wherein said monitoring step occurs when no sheet is being passed over the window.

4. The method of claim 1, wherein said monitoring step occurs while an image-bearing sheet is being passed over the window.

5. The method of claim 4, wherein the speed at which an image-bearing sheet is caused to pass over the window is altered to compensate for motion of the scan line relative to the window.

6. The method of claim 1, wherein the scan line is caused to move relative to the window against the process direction.

7. The method of claim 1, wherein the scan line is caused to move relative to the window along the process direction.

8. The method of claim 1, wherein the scan line is caused to move relative to the window alternately with the process direction and against the process direction.

9. The method of claim 1, wherein the causing step includes altering a position of an optical element associated with the window.

10. The method of claim 9, wherein the causing step includes altering a position of a mirror associated with the window.

11. The method of claim 1, wherein the causing step includes altering a position of the photosensitive member.

12. In a document handler for causing an image-bearing sheet to pass over a light-transmissive window in a process direction for recording by a photosensitive member, the photosensitive member being exposed to a portion of the image-bearing sheet through a scan line which is narrower than the window along the process direction, a method comprising the steps of:
   detecting a spot on the window intersecting the scan line;
   and causing the scan line to move parallel to the process direction relative to the window in response to the detecting step.

13. The method of claim 12, further comprising the step of
   monitoring an output of the photosensitive member as the scan line is caused to move through a series of positions along the window.

14. The method of claim 13, is wherein said monitoring step occurs when no sheet is being passed over the window.

15. The method of claim 13, wherein said monitoring step occurs while an image-bearing sheet is being passed over the window.

16. The method of claim 15, wherein the speed at which an image-bearing sheet is caused to pass over the window is altered to compensate for motion of the scan line relative to the window.

17. The method of claim 12, wherein the scan line is caused to move relative to the window against the process direction.

18. The method of claim 12, wherein the scan line is caused to move relative to the window along the process direction.

19. The method of claim 12, wherein the scan line is caused to move relative to the window alternately with the process direction and against the process direction.

20. The method of claim 12, wherein the causing step includes altering a position of an optical element associated with the window.

21. The method of claim 20, wherein the causing step includes altering a position of a mirror associated with the window.

22. The method of claim 12, wherein the causing step includes altering a position of the photosensitive member.

* * * * *